Aug. 5, 1941.  A. W. STEPHENSON  2,251,505
ELECTROMAGNETIC MOTOR
Filed Dec. 16, 1940  2 Sheets-Sheet 1

Albert W. Stephenson, INVENTOR
BY Victor J. Evans & Co.
ATTORNEYS

Aug. 5, 1941.  A. W. STEPHENSON  2,251,505
ELECTROMAGNETIC MOTOR
Filed Dec. 16, 1940  2 Sheets-Sheet 2
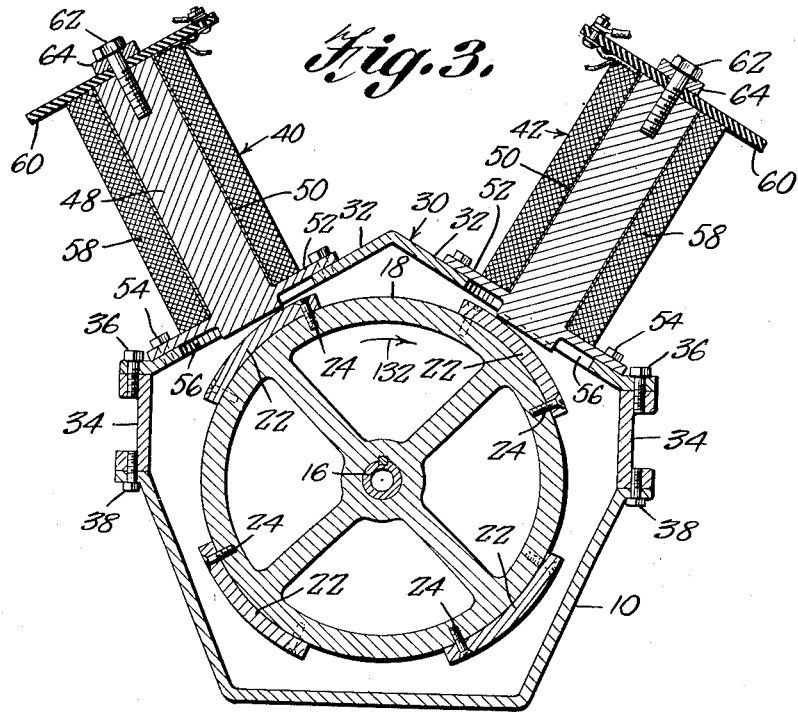
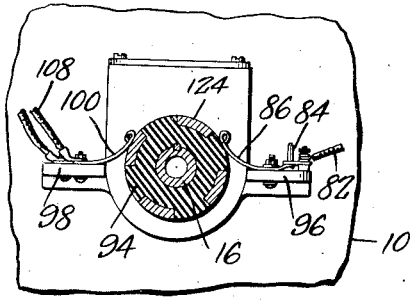
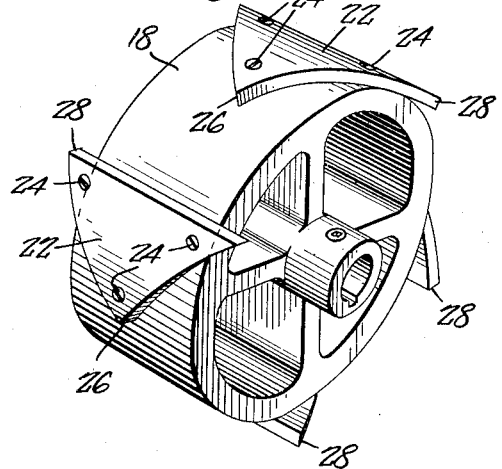
Albert W. Stephenson,
INVENTOR
BY Victor J. Evans & Co.
ATTORNEYS Patented Aug. 5, 1941

2,251,505

UNITED STATES PATENT OFFICE 2,251,505

ELECTROMAGNETIC MOTOR

Albert W. Stephenson, Indianapolis, Ind.

Application December 16, 1940, Serial No. 370,411

3 Claims. (Cl. 172—36)

My invention relates to engines, and has among its objects and advantages the provision of an improved magnetic motor.

In the accompanying drawings:

Figure 3 is a sectional view taken substantially alone the line 3—3 of Figure 1;

Figure 4 is a sectional view along the line 4—4 of Figure 1; and

Figure 5 is a perspective view of one of the rotors.

Figure 1:
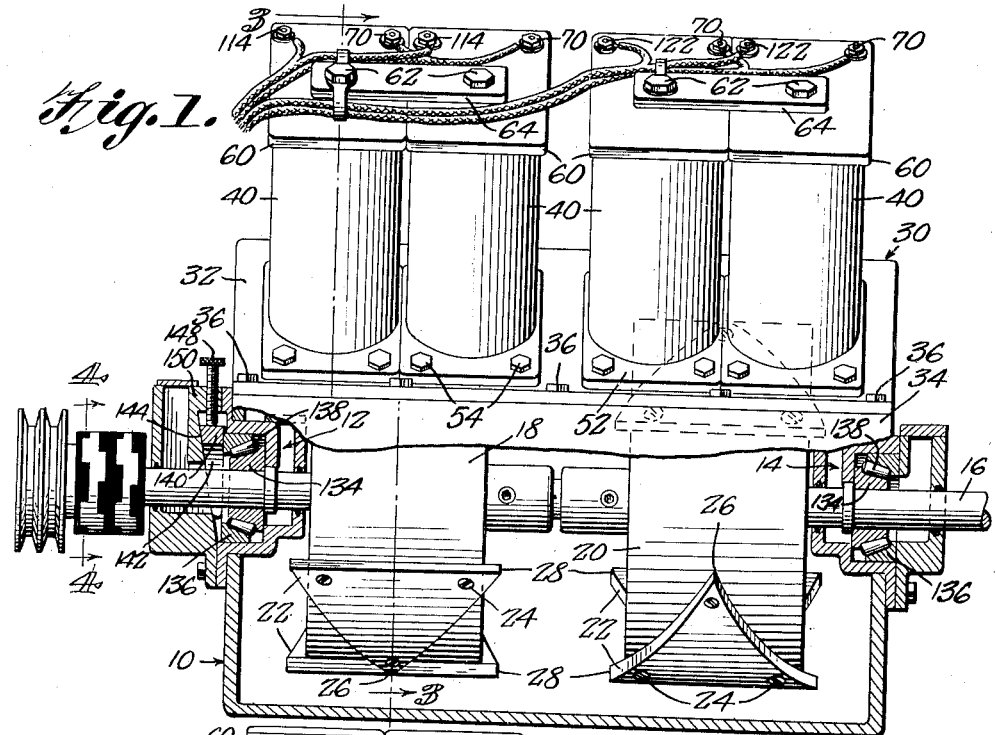
Figure 1 is a side elevational view of the engine with certain parts removed for the purpose of illustration.

In the embodiment selected to illustrate my invention, the engine housing 10 is provided with bearings 12 and 14 which rotatably support a shaft 16 to which rotors 18 and 20 are secured. The rotors are preferably of brass and each carries four armatures 22 secured thereto by bolts 24. The armatures 22 are triangular in configuration and the armatures on each rotor have their pointed ends 26 extending in the same direction, but the armatures on the rotor 18 are reversed with respect to the armatures on the rotor 20. Each armature has its two pointed ends 28 extending slightly beyond the ends of its respective rotor.

Housing 10 includes a brass cover section 30 having angular wall portions 32, and the cover section is secured to the housing section 34 by bolts 36, the housing section 34 being secured to the housing 10 by bolts 38. Upon the wall portions 32 are located electromagnets 40, 42, 44 and 46. Electromagnets 40 and 42 act on the rotor 18, while the electromagnets 44 and 46 act on the rotor 20.

Fig. 3 illustrates the specific construction of one each of the electromagnets 40 and 42. Since all the electromagnets are identical in construction, the description of one will apply to all. The core 48 is encased in a brass sleeve 50 and includes a flange 52 bolted to its respective wall portion 32, as at 54. Openings 56 are provided in the wall portions 32 so that the inner ends of the cores 48 may be located in close proximity to their respective armatures 22.

The winding 58 is wrapped about the brass sleeve 50 and to the outer end of the core 48 is secured a fiber plate 60 by means of a bolt 62 threaded into the core. A metallic bar 64 interconnects the cores 48 of the two electromagnets 40, and similar bars also connect the cores in the pairs of electromagnets 42, 44 and 46. The bolts 62 secure the bars 64.

The electromagnets 40 and 42 are circumferentially aligned with respect to the rotor 18 in such manner as to bring the pointed ends 26 of the rotor between the electromagnets of each pair. The electromagnets 44 and 46 are similarly aligned with respect to the armatures of the rotor 20.

Figure 2:
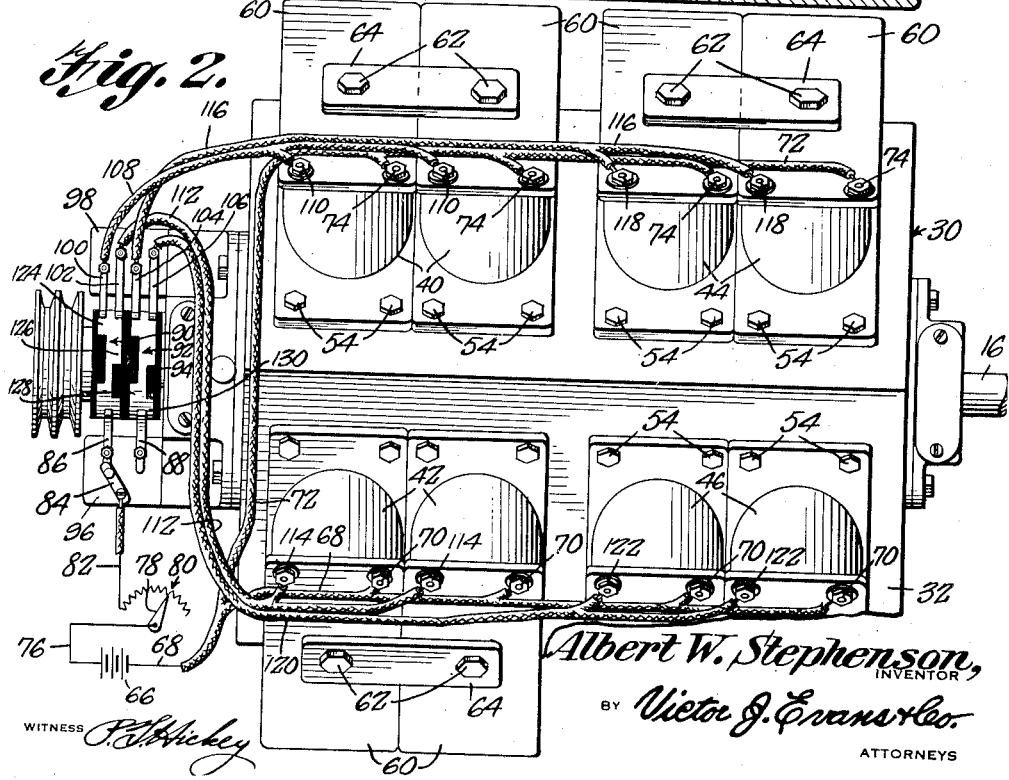
Figure 2 is a top plan view.

In Fig. 2, the battery 66 connects with a wire 68 connected with terminals 70 of the windings on the electromagnets 42 and 46; and the wire 68 has a branch 72 which connects with terminals 74 of the windings of the electromagnets 40 and 44. A wire 76 connects with the other terminal of the battery and the wiper element 78 of a rheostat 80, the rheostat being connected with a lead 82 connected with a switch member 84 arranged to be selectively moved into engagement with conductors 86 and 88. Conductors 86 and 88 are of strap-like resilient material to respectively bear on conductor bands 90 and 92 anchored in a fiber drum 94 fixed to the shaft 16.

The conductors 86 and 88 are mounted on a fiber support 96 secured to the housing of the motor, and a similar fiber support 98 carries four conductor strips 100, 102, 104 and 106. The conductor strips 100 to 106 possess resilient properties so that the two conductors 100 and 102 are pressed against the conductor band 90 and the conductors 104 and 106 against the band 92. To the conductor strip 100 is connected a wire 108 which connects with the second terminals 110 of the windings of the two electromagnets 40. A wire 112 connects the conductor strip 102 with the second terminals 114 of the windings of the two electromagnets 42.

To the conductor strip 104 is connected a wire 116 which connects with the second terminals 118 of the windings of the electromagnets 44. Conductor strip 106 connects with a wire 120 which connects with the second terminals 122 of the windings of the two electromagnets 46. The conductor band 90 is contoured to provide four contact wings 124 aligned with the conductor strip 100 and four wings 126 aligned with the conductor strip 102. Conductor 86 maintains continuous engagement with the conductor band 90. Similarly, the conductor band 92 is contoured to provide four wings 128 and four wings 130 respectively aligned with the conductor strips 104 and 106. Conductor 88 maintains continuous engagement with the conductor band 92. The wings 124 overlap about half their length with the wings 126, and the wings 128 overlap with the wings 130 in the same degree.

With the switch member 84 in engagement with the conductor strip 86, the two pairs of electromagnets 40 and 42 are brought into action, with the two pairs of electromagnets 44 and 46 remaining inactive. Accordingly, the two electromagnets 40 are simultaneously energized. While the electromagnets 42 are simultaneously energized, the two pairs are energized in such order and at such time intervals as to act on the armatures 22 of the rotor 18 to rotate the rotor in the direction of the arrow 132 in Fig. 3. Ends 26 of the armatures 22 constitute the leading ends of the armatures.

When the switch member 84 is moved into engagement with the conductor 88, the circuit will be effective on the electromagnets 44 and 46, these magnets being energized in the same manner as the electromagnets 40 and 42. With the armatures 22 of the rotor 20 reversed with respect to their pointed ends 26, the rotor 20 will turn in an opposite direction so as to reverse the motor.

Bearings 12 and 14 each includes a race 134 mounted on the shaft 16 and an outer race 136 between which roller elements 138 are positioned. Against the race 136 is positioned a tapered member 140 having an enlarged opening 142 for accommodating the shaft 16, and the tapered member bears against an angular wall 144. A set screw 146 is threaded into a casting 150 and bears against the tapered member 140 so that the latter may be adjusted to shift the race 136 to compensate for wear.

I claim:

1. An electromagnetic motor comprising a rotative shaft, a rotor fixed to said shaft, electromagnets, pointed armatures fixed to the rotor and arranged in operative relation with said electromagnets, an electric circuit connected with said electromagnets, means actuated through rotation of said shaft for periodically energizing the electromagnets in timed relation to said armatures, said electromagnets being grouped in pairs spaced circumferentially of said rotor, and the electromagnets in each pair being spaced on opposite sides of the points of the armatures.

2. An electromagnetic motor comprising a rotative shaft, a rotor fixed to said shaft, electromagnets, pointed armatures fixed to the rotor and arranged in operative relation with said electromagnets, an electric circuit connected with said electromagnets, means actuated through rotation of said shaft for periodically energizing the electromagnets in timed relation to said armatures, said electromagnets being grouped in pairs spaced circumferentially of said rotor, the electromagnets in each pair being spaced on opposite sides of the points of the armatures, a second rotor fixed to said shaft, pointed armatures fixed to said second rotor with the points of the armatures reversed with respect to said first armatures, and electromagnetic means operatively related to said second rotor and operatively connected into said electric circuit.

3. An electromagnetic motor comprising a rotative shaft, a rotor fixed to said shaft, electromagnets, pointed armatures fixed to the rotor and arranged in operative relation with said electromagnets, an electric circuit connected with said electromagnets, means actuated through rotation of said shaft for periodically energizing the electromagnets in timed relation to said armatures, said electromagnets being grouped in pairs spaced circumferentially of said rotor, the electromagnets in each pair being spaced on opposite sides of the points of the armatures, a second rotor fixed to said shaft, pointed armatures fixed to said second rotor with the points of the armatures reversed with respect to said first armatures, electromagnetic means operatively related to said second rotor and operatively connected into said electric circuit, said rotors being formed of brass, and brass sleeves on the cores of said electromagnets.

ALBERT W. STEPHENSON.